W. KEARNS.
SPRING FINGER TOOL FOR TIRE BUILDING MACHINES.
APPLICATION FILED NOV. 28, 1914.
1,162,072. Patented Nov. 30, 1915.
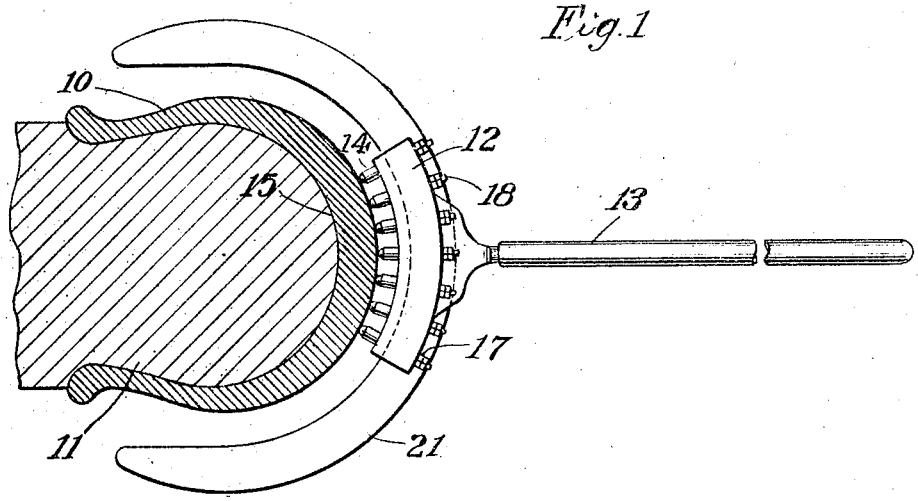
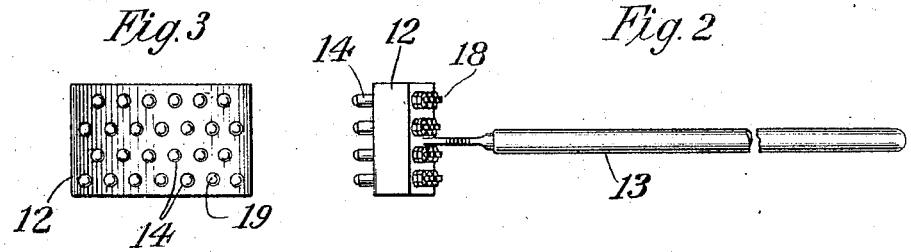
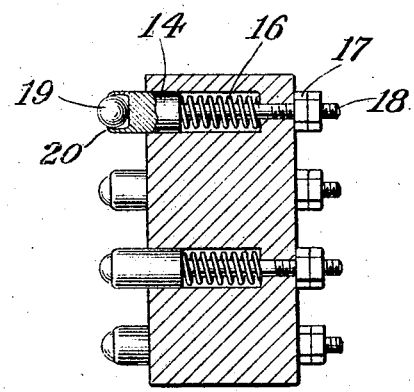
Witnesses:
Raphaël Letter
Francis Boyle
William Kearns, Inventor
By his Attorney
Ernest Hopkinson

UNITED STATES PATENT OFFICE.

WILLIAM KEARNS, OF DETROIT, MICHIGAN, ASSIGNOR TO MORGAN & WRIGHT, A CORPORATION OF MICHIGAN.

SPRING-FINGER TOOL FOR TIRE-BUILDING MACHINES.

1,162,072.  Specification of Letters Patent.  Patented Nov. 30, 1915.

Application filed November 28, 1914. Serial No. 874,373.

*To all whom it may concern:*

Be it known that I, WILLIAM KEARNS, a citizen of the United States, residing at Detroit, county of Wayne, State of Michigan, have invented certain new and useful Improvements in Spring-Finger Tools for Tire-Building Machines, of which the following is a full, clear, and exact description.

This invention relates to tire building machines and has for an object to provide a hand tool for smoothing down the tire in such a manner as to remove inequalities in the surface thereof.

In the manufacture of tires it is customary to employ a revoluble ring core upon which the tire is built from successive layers of rubber treated fabric pressed to conform intimately to the configuration of the core. The present invention provides a hand tool adapted to operate upon the surface of the tire thus formed and to smooth out inequalities and to press the layers into more intimate association with each other, the tool being without any automatic control whatever, but wholly manipulated by hand, so that flexibility of operation in adapting the tool to the needs of the tire will be assured.

With the above objects in view, the invention consists in certain novel details of construction and combination of parts hereinafter fully described and claimed, it being understood that various modifications may be resorted to within the scope of the appended claims.

In the accompanying drawing, forming part of this specification, Figure 1 is a plan view showing the tool in one operative position; Fig. 2 is an end elevation of the tool; Fig. 3 is an elevation of the working face of the tool; Fig. 4 is a sectional view showing the construction of the spring fingers.

Referring now to the drawing in which like characters of reference designate similar parts, 10 designates a tire which is supported upon a ring core 11 of the usual type, both being revoluble as a unit on a horizontal axis in the usual manner.

In carrying out the invention I provide a smoothing and compacting tool for the tire comprising a curved body 12 to the rear face of which is attached a handle 13 for manipulating the tool. The front face of the body is counterbored to receive spring-pressed fingers 14 arranged preferably in parallel rows as shown best in Fig. 2, the fingers of each row being set at such angle relative to each other that they extend radially with respect to the curvature of the body, which latter, it may here be stated, preferably conforms to the curvature of the curved face 15 of the core. Furthermore, the fingers of each row are staggered relative to the fingers of the next adjacent row, as shown in Fig. 3, whereby the operative or working area of the tool is enhanced.

The outward movement of each finger under thrust of its spring 16, is regulated by set nuts 17, threaded upon the stem 18 of the finger and bearing against the rear face of the tool body. For preventing mutilation of the tire, an anti-friction ball 19 is countersunk in the end of each finger, the edge 20 of the countersink being crimped over the ball to rotatably confine the same in position.

The tool above described is designed to be supported upon a steady tool rest 21, which is preferably curved to conform to the curved face of the core as best shown in Fig. 1, and presents its working face in a plane which intersects the plane of the core at a right angle.

In operation, the ring core with the tire thereon, is rotated in the usual manner, downward, in a path past the tool rest. The operator places the smoothing and compacting tool upon the rest and shoves forwardly upon the handle of the tool to force the ball-tipped fingers against the surface of the tire. During rotation of the tire the fingers generate respective contiguous rings on the surface of the tire, thereby intimately attaching the various layers at points coincident with said rings. The tool is manually slid upon the rest around the sides and crown of the tire, so that every point on the surface thereof will be operated upon. Since the fingers of each row extend radially with respect to the curved surface of the body, they will operate when the tool is moved from the crown of the tire toward the toe portions thereof, to draw the layers radially from the crown of the tire toward the toe portions, whereby creases and other wrinkles which may be formed in the tire during its manufacture, are smoothed out and a homogeneous tire, devoid of wrinkles, produced.

It will be seen from the above description that I have provided a smoothing and compacting tool that is without any automatic control whatever, but wholly portable and manipulable by hand, so that flexibility of operation in holding the tool stationary at desired places where most necessary upon the tire, will be assured.

Having described my invention, what I claim and desire to have protected by Letters Patent is:

1. A tire smoothing and compacting tool, embodying a support, a plurality of yielding fingers thereon, and an anti-friction ball in the tip of each finger for contact with the surface of the tire.

2. A tire smoothing and compacting tool, embodying a support, a plurality of yielding fingers thereon, and a ball rotatably confined in the tip of each finger for contact with the tire.

3. A tire smoothing and compacting tool, embodying a curved support, rows of yielding fingers thereon, the fingers of each row being disposed radially with respect to the support and an anti-friction ball in the tip of each finger for contact with the tire.

4. A tire smoothing and compacting tool, embodying a support, rows of yielding fingers thereon, the fingers of each row being staggered relative to the fingers of the next adjacent row, and an anti-friction ball in the tip of each finger for contact with the tire.

5. A tire smoothing and compacting tool, embodying a support, a plurality of spring-pressed fingers carried thereby, means for regulating the outward movement of said fingers under thrust of the springs thereof, and an anti-friction ball in the tip of each finger for contact with the surface of the tire.

6. A tire smoothing and compacting tool, embodying a support adapted to be manually moved in a plane intersecting the plane of the tire at a right angle, and a plurality of yielding fingers on the body, set at an angle to each other and each having a rounded tip for contact with the tire.

7. A tire smoothing and compacting apparatus, embodying a support adapted to be moved in a plane intersecting the plane of the tire at a right angle, a rest for said support, and a plurality of yielding fingers on the body, set at an angle to each other and each having a rounded tip for contact with the tire.

Signed at Detroit, county of Wayne, State of Michigan, this 23rd day of November, 1914.

WILLIAM KEARNS.

Witnesses:
JOHN CARLSON,
J. H. SWIFT.